V. SQUARZA.
MACHINE FOR EXTRACTING ESSENTIAL OILS.
No. 52,764. Patented Feb. 20, 1866.
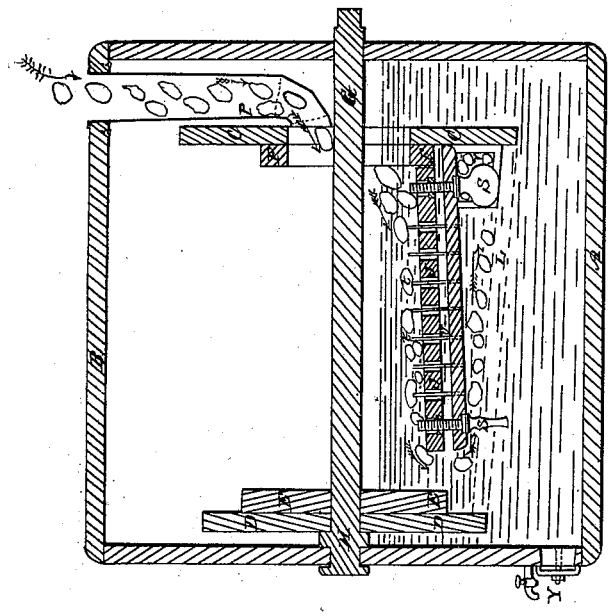
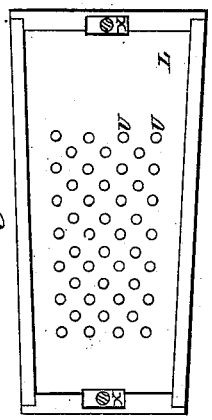
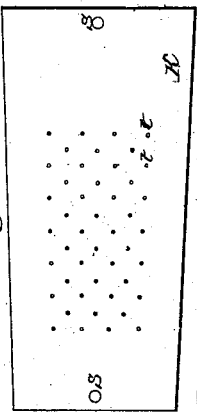
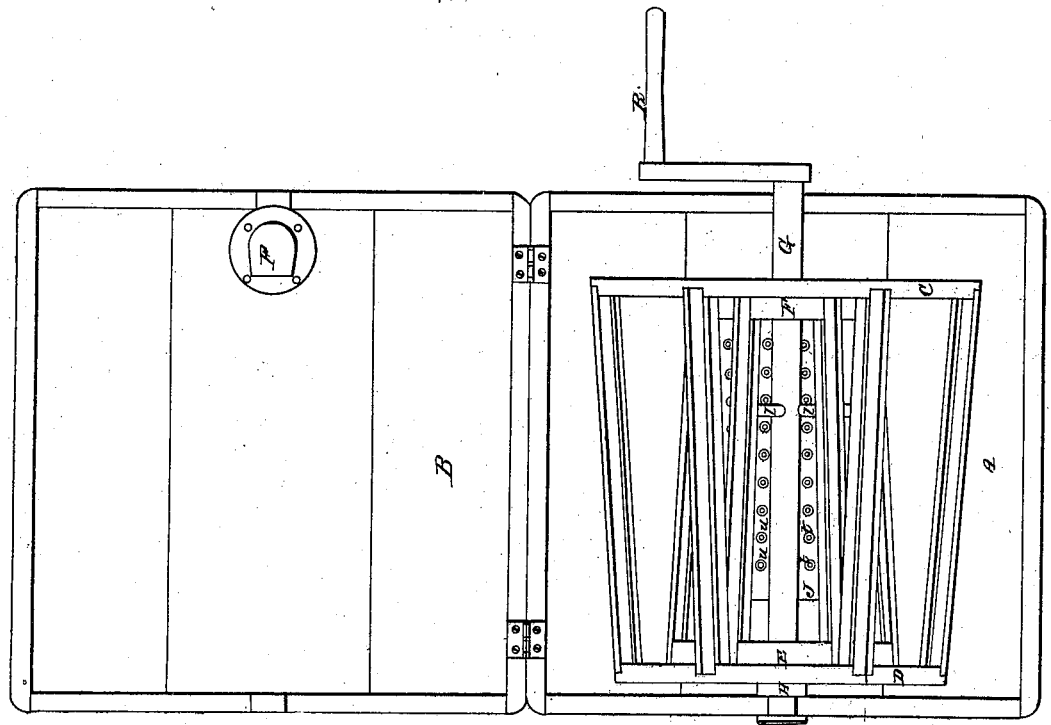

UNITED STATES PATENT OFFICE.

VINCENT SQUARZA, OF SAN FRANCISCO, CALIFORNIA.

IMPROVED MACHINE FOR EXTRACTING ESSENTIAL OILS.

Specification forming part of Letters Patent No. 52,764, dated February 20, 1866.

*To all whom it may concern:*

Be it known that I, VINCENT SQUARZA, of the city and county of San Francisco, State of California, have invented a new and Improved Machine for Extracting the Essential Oils from Fruit, &c., called "Squarza's Essential-Oil Extractor;" and I do hereby declare that the following is a full, clear, and exact description of the construction and operation of the same, reference being had to the accompanying drawings, making part of this specification, in which—

Figure 1 is a plan of the machine; Fig. 2, a longitudinal section; Fig. 3, view of the fixed cover of the outer hexagonal box or compartment; Figs. 4 and 5, plan and edge views of the movable cover of the outer hexagonal compartment.

The nature of my invention relates to the employment of sharp-pointed pins of steel or other material for puncturing the rind of the orange, lemon, lime, or other fruit containing the essential oils, the fruit passing through a series of compartments and coming in contact with the sharp projecting points.

To enable others skilled in the art to make and use my invention, I will proceed to describe its construction and operation, referring to the drawings, in which letters indicate like parts in each of the figures.

My machine consists, essentially, of a tight box, A, with cover B, of any form desired, the body being composed of several compartments, C D E F, the one within the other, having the form of a truncated pyramid with hexagonal base, the whole arranged to rotate upon the shaft G and bearings H H, the inner compartment having an orifice, P, at its smaller end, and through which the fruit to be used is passed into the machine. The diameter of this first interior compartment increases toward the extremity opposite that where the fruit enters, so that when the concentric hexagonal boxes are hung so as to rotate upon a horizontal axis there will be a general downward inclination of fruit in the box or compartment from where it is admitted toward the opposite end sufficient to cause the fruit to find its way to the larger end or where there is an aperture, opening into the second box or compartment exterior to the first, having its greatest diameter at the end opposite to that at which it receives the fruit from the first, and consequently at the end where the first compartment has its least diameter, and passes from the larger end of the innermost box into the smaller end of the second, and from thence, by the same inclination, into the smaller end of the third, and so on to the outer compartment, which in its turn enlarges in the opposite direction from where the fruit enters. On the inside of the largest end of the outer compartment is a series of boxes, (shown at V V, Fig. 2,) where the fruit, having passed through the whole of the compartments, is collected and thrown back in the same inner compartment.

Upon one side of each of the hexagonal compartments is a fixed cover, L, perforated at U U and fastened to the frame of the compartment at X X, Fig. 3, a movable cover, K K, having sharp steel points $t$ $t$ about three-fourths of an inch long and one inch apart, (more or less,) or to correspond with the apertures in the fixed cover against which it is placed, the steel points projecting through it. This movable cover is kept in place and the length of the points regulated upon the inner side by means of set-screws S S, which separate or draw through the double covers, as may be desired.

The mode in which my machine is operated is as follows: While the hexagonal boxes are slowly revolving the fruit, passing into the innermost compartment through the aperture at P, rolls over the sharp points $t$ $t$, and gradually reaches the larger end, where it passes into the second, and by a reverse process reaches the third, fourth, and so on, or to the last or outer compartment. Three may be found sufficient. Here the fruit is received by a series of boxes, as described, by which it is caught and thrown back into the inner compartment again until the operation is completed.

The motion of the fruit over the sharp points perforates or punctures the rind, breaking the cells and setting free the essential oil without molesting the pulp or altering the exterior appearance, and allowing the liquid in which the fruit during the process is kept immersed to assimilate to the essential oil.

The liquid intended to be impregnated is placed in the box A in a sufficient quantity with the essential oil, and may be of a spirituous, oleaginous, or fermented nature, or water; but when it is desirous of obtaining the essential-oil extract proper it is necessary to use the highest proof-spirit. After it has assimilated with and taken up the quantity of essential oil desired an adequate addition of water is required to separate or disengage the oil from the spirit in the usual way and manner in such processes.

Having thus described my machine for extracting essential oils so as to enable any one skilled in the art to make and use the same without further invention or experiment, I will now proceed to state what I claim and desire to secure by Letters Patent, to wit:

As a new invention, the compartments C D E F, having one or more perforated fixed covers, L, adjustable cover K, with points $t\ t$, or their equivalents, arranged as herein described, and for the purpose set forth.

In witness whereof I have hereunto set my hand and seal this 1st day of September, A. D. 1865.

V. SQUARZA. [L. S.]

Witnesses:
C. W. M. SMITH,
J. C. COLLINS.